(12) United States Patent
Fukui

(10) Patent No.: US 11,270,171 B2
(45) Date of Patent: Mar. 8, 2022

(54) INK DISCHARGE COMPLEMENTING METHOD AND PRINTING APPARATUS

(71) Applicant: SCREEN HOLDINGS CO., LTD., Kyoto (JP)

(72) Inventor: Kazuki Fukui, Kyoto (JP)

(73) Assignee: SCREEN HOLDINGS CO., LTD., Kyoto (JP)

(\*) Notice: Subject to any disclaimer, the term of this patent is extended or adjusted under 35 U.S.C. 154(b) by 0 days.

(21) Appl. No.: 17/192,473

(22) Filed: Mar. 4, 2021

(65) Prior Publication Data

US 2021/0303941 A1 Sep. 30, 2021

(30) Foreign Application Priority Data

Mar. 25, 2020 (JP) .............................. JP2020-054013

(51) Int. Cl.
*G06K 15/02* (2006.01)
*G06K 15/10* (2006.01)
*B41J 2/21* (2006.01)

(52) U.S. Cl.
CPC .......... *G06K 15/027* (2013.01); *B41J 2/2142* (2013.01); *G06K 15/102* (2013.01); *G06K 15/1881* (2013.01)

(58) Field of Classification Search
CPC .............. G06K 15/027; G06K 15/102; G06K 15/1881; B41J 2/2142
See application file for complete search history.

(56) References Cited

U.S. PATENT DOCUMENTS

| | | | |
|---|---|---|---|
| 2012/0242732 A1* | 9/2012 | Nagahara | B41J 2/2142 347/14 |
| 2015/0224761 A1 | 8/2015 | Sato et al. | |
| 2015/0283833 A1 | 10/2015 | Fukui et al. | |
| 2016/0297192 A1 | 10/2016 | Sato et al. | |
| 2016/0309056 A1* | 10/2016 | Wakui | H04N 1/605 |
| 2017/0129236 A1 | 5/2017 | Sato et al. | |

FOREIGN PATENT DOCUMENTS

| | | |
|---|---|---|
| JP | 2006-076085 A | 3/2006 |
| JP | 2006-076086 A | 3/2006 |
| JP | 2015-150751 A | 8/2015 |

OTHER PUBLICATIONS

Extended European Search Report issued in corresponding European Patent Application No. 21160106.7-1017, dated Oct. 15, 2021.

\* cited by examiner

*Primary Examiner* — Quang N Vo
(74) *Attorney, Agent, or Firm* — McDermott Will & Emery LLP

(57) ABSTRACT

The conversion of the dot percentages using the first conversion table Td1 and the second conversion table Td2 is performed for the gradation data Dh by the defective nozzle corrector 95. Here, the first conversion table Td1 converts the dot percentages of the pixels Px corresponding to the normal nozzles Nn having no discharge defect by the first rate Rd1 lower than 100%, and the second conversion table Td2 converts the dot percentages of the pixels Px corresponding to the surrounding nozzles Na located around the defective nozzle Nd by the second rate Rd2 higher than the first rate Rd1. Then, the shading correction is performed for the defect complemented gradation data Dc obtained by converting the dot percentages in this way by the shading corrector 96.

7 Claims, 13 Drawing Sheets

FIG. 9A

| INPUT NET % | DEFECTIVE NOZZLE LUT | OUTPUT NET % |
|---|---|---|
| 0 | 0 | 0 |
| : | : | : |
| : | : | : |
| 30 | 21 | 12 |
| : | : | : |
| : | : | : |
| 100 | 70 | 74 |

FIG. 9B

| INPUT NET % | DEFECTIVE NOZZLE LUT | OUTPUT NET % |
|---|---|---|
| 0 | 0 | 0 |
| : | : | : |
| : | : | : |
| 30 | 39 | 26 |
| : | : | : |
| : | : | : |
| 70 | 72 | 69 |
| : | : | : |
| 100 | 98 | 92 |

INK DISCHARGE COMPLEMENTING METHOD AND PRINTING APPARATUS

CROSS REFERENCE TO RELATED APPLICATION

The disclosure of Japanese Patent Application No. 2020-054013 filed on Mar. 25, 2020 including specification, drawings and claims is incorporated herein by reference in its entirety.

BACKGROUND OF THE INVENTION

1. Field of the Invention

This invention relates to a technique for complementing an ink discharge defect of a defective nozzle, out of a plurality of nozzles of a discharge head.

2. Description of the Related Art

A printing technique is known which prints an image on a printing medium by discharging ink to the printing medium from a plurality of nozzles of a discharge head. In such a printing technique, a defective nozzle having an ink discharge defect may occur due to the clogging of the solidified ink in the nozzle or the like. In such a case, since the ink is not discharged at a position corresponding to the defective nozzle, a white streak is caused in an image. Accordingly, in JP 2015-150751A, the occurrence of a defective nozzle is dealt with by increasing the amount of ink discharged from surrounding nozzles located around a defective nozzle.

SUMMARY OF THE INVENTION

However, in a method of JP 2015-150751A, a cumbersome control of preparing a table for each image density and properly using these tables is executed to change the amount of the ink discharged from the adjacent nozzles according to a density of an image to be printed. Accordingly, there has been a demand for a technique capable of dealing with a defective nozzle by a simple control.

This invention was developed in view of the above problem and aims to provide a technique capable of dealing with a defective nozzle by a simple control.

An ink discharge complementing method according to the first aspect of the invention, complements an ink discharge defect of a defective nozzle, out of a plurality of nozzles of a discharge head, and comprises: a gradation data acquisition step of obtaining gradation data representing a gradation value of each of a plurality of pixels constituting a print image; a conversion step of converting the gradation data into defect complemented gradation data by converting the gradation values of the gradation data, using a first conversion rule for the gradation values of the pixels corresponding to normal nozzles other than surrounding nozzles located around the defective nozzle and the defective nozzle, out of the plurality of nozzles, and a second conversion rule for the gradation values of the pixels corresponding to the surrounding nozzles; a shading correction step of performing a shading correction to correct a variation of an amount of the ink discharged from each of the plurality of nozzles for the defect complemented gradation data; a halftone step of generating discharge control data by performing a halftone process for the defect complemented gradation data having the shading correction performed therefor; and an image printing step of printing the print image on a printing medium by the ink discharged from the nozzles by driving the nozzles based on the discharge control data, the first conversion rule converting the gradation values of the pixels corresponding to the normal nozzles by a first rate lower than 100%, and the second conversion rule converting the gradation values of the pixels corresponding to the surrounding nozzles by a second rate higher than the first rate.

A printing apparatus according to the first aspect of the invention, includes a discharge head having a plurality of nozzles and configured to complement an ink discharge defect of a defective nozzle, out of the plurality of nozzles, and comprises: a gradation data acquisitor which obtains gradation data representing a gradation value of each of a plurality of pixels constituting a print image; a storage which stores a first conversion rule for the gradation values of the pixels corresponding to normal nozzles other than surrounding nozzles located around the defective nozzle and the defective nozzle, out of the plurality of nozzles, and a second conversion rule for the gradation values of the pixels corresponding to the surrounding nozzles; a data converter which converts the gradation data into defect complemented gradation data by converting the gradation values of the gradation data using the first conversion rule and second conversion rule stored in the storage; a shading corrector which performs a shading correction to correct a variation of an amount of the ink discharged from each of the plurality of nozzles for the defect complemented gradation data; a halftone processor which generates discharge control data by performing a halftone process for the defect complemented gradation data having the shading correction performed therefor; and a drive controller which prints the print image on a printing medium by the ink discharged from the nozzles by driving the nozzles based on the discharge control data, the first conversion rule converting the gradation values of the pixels corresponding to the normal nozzles by a first rate lower than 100%, and the second conversion rule converting the gradation values of the pixels corresponding to the surrounding nozzles by a second rate higher than the first rate.

In the first aspect of the invention thus configured, the gradation values are converted using the first conversion rule and second conversion rule for the gradation data representing the gradation value of each of the plurality of pixels constituting the print image. Here, the first conversion rule converts the gradation values of the pixels corresponding to the normal nozzles having no discharge defect by the first rate lower than 100%, and the second conversion rule converts the gradation values of the pixels corresponding to the surrounding nozzles located around the defective nozzle by the second rate higher than the first rate. Then, the shading correction is performed for the defect complemented gradation data obtained by converting the gradation values in this way. This can complement the discharge defect of the defective nozzle by substantially adding the gradation values of the pixels corresponding to the surrounding nozzles compared to the gradation values of the pixels corresponding to the normal nozzles. In this way, the defective nozzle can be dealt with by a simple control.

Further, there is the following advantage since the defective nozzle is dealt with by operating the gradation values before the halftone process is performed. That is, the halftone process adjusts the discharge of the ink to the pixels based on the gradation value of an entire area wider than the pixel corresponding to the surrounding nozzle. Thus, even if the gradation value of the pixel corresponding to the surrounding nozzle is substantially added, the amount of the ink discharged from the surrounding nozzle is not directly increased, but the discharge of the ink from the surrounding nozzle is adjusted according to the gradation value in the entire area including the pixel corresponding to the surrounding nozzle. Therefore, a more natural image can be printed.

An ink discharge complementing method according to the second aspect of the invention, complements an ink discharge defect of a defective nozzle, out of a plurality of nozzles of a discharge head, and comprises: a gradation data acquisition step of obtaining gradation data representing a gradation value of each of a plurality of pixels constituting a print image; a shading correction step of performing a shading correction to correct a variation of an amount of the ink discharged from each of the plurality of nozzles for the gradation data; a conversion step of converting the gradation data into defect complemented gradation data by converting the gradation values of the gradation data, which has the shading correction performed therefor, using a first conversion rule for the gradation values of the pixels corresponding to normal nozzles other than surrounding nozzles located around the defective nozzle and the defective nozzle, out of the plurality of nozzles, and a second conversion rule for the gradation values of the pixels corresponding to the surrounding nozzles; a halftone step of generating discharge control data by performing a halftone process for the defect complemented gradation data; and an image printing step of printing the print image on a printing medium by the ink discharged from the nozzles by driving the nozzles based on the discharge control data, the first conversion rule converting the gradation values of the pixels corresponding to the normal nozzles by a first rate lower than 100%, and the second conversion rule converting the gradation values of the pixels corresponding to the surrounding nozzles by a second rate higher than the first rate.

A printing apparatus according to the second aspect of the invention, includes a discharge head having a plurality of nozzles and configured to complement an ink discharge defect of a defective nozzle, out of the plurality of nozzles, and comprises: a gradation data acquisitor which obtains gradation data representing a gradation value of each of a plurality of pixels constituting a print image; a shading corrector which performs a shading correction to correct a variation of an amount of the ink discharged from each of the plurality of nozzles for the gradation data; a storage which stores a first conversion rule for the gradation values of the pixels corresponding to normal nozzles other than surrounding nozzles located around the defective nozzle and the defective nozzle, out of the plurality of nozzles, and a second conversion rule for the gradation values of the pixels corresponding to the surrounding nozzles; a data converter which converts the gradation data into defect complemented gradation data by converting the gradation values of the gradation data having the shading correction performed therefor, using the first conversion rule and second conversion rule stored in the storage; a halftone processor which generates discharge control data by performing a halftone process for the defect complemented gradation data; and a drive controller which prints the print image on a printing medium by the ink discharged from the nozzles by driving the nozzles based on the discharge control data, the first conversion rule converting the gradation values of the pixels corresponding to the normal nozzles by a first rate lower than 100%, and the second conversion rule converting the gradation values of the pixels corresponding to the surrounding nozzles by a second rate higher than the first rate.

In the second aspect of the invention thus configured, the shading correction is performed for the gradation data representing the gradation value of each of the plurality of pixels constituting the print image. Then, the gradation values are converted using the first conversion rule and second conversion rule for the gradation data having the shading correction performed therefor in this way. Here, the first conversion rule converts the gradation values of the pixels corresponding to the normal nozzles having no discharge defect by the first rate lower than 100%, and the second conversion rule converts the gradation values of the pixels corresponding to the surrounding nozzles located around the defective nozzle by the second rate higher than the first rate. This can complement the discharge defect of the defective nozzle by substantially adding the gradation values of the pixels corresponding to the surrounding nozzles compared to the gradation values of the pixels corresponding to the normal nozzles. In this way, the defective nozzle can be dealt with by a simple control.

Further, there is the following advantage since the defective nozzle is dealt with by operating the gradation values before the halftone process is performed. That is, the halftone process adjusts the discharge of the ink to the pixels based on the gradation value of an entire area wider than the pixel corresponding to the surrounding nozzle. Thus, even if the gradation value of the pixel corresponding to the surrounding nozzle is substantially added, the amount of the ink discharged from the surrounding nozzle is not directly increased, but the discharge of the ink from the surrounding nozzle is adjusted according to the gradation value in the entire area including the pixel corresponding to the surrounding nozzle. Therefore, a more natural image can be printed.

As described above, according to the invention, it is possible to deal with a defective nozzle by a simple control.

As described above, according to the invention, the formation of wrinkles in an ink discharge range can be suppressed in printing an image by discharging ink to a printing medium while conveying the printing medium in a conveying direction.

BRIEF DESCRIPTION OF THE DRAWINGS

FIG. 9A is a table showing numerical value examples of the dot percentages converted by the defective nozzle correction and the shading correction for the normal nozzle for the normal nozzle.

FIG. 9B is a table showing numerical value examples of the dot percentages converted by the defective nozzle correction and the shading correction for the defective nozzle.

DETAILED DESCRIPTION OF THE PREFERRED EMBODIMENTS

Figure 1:
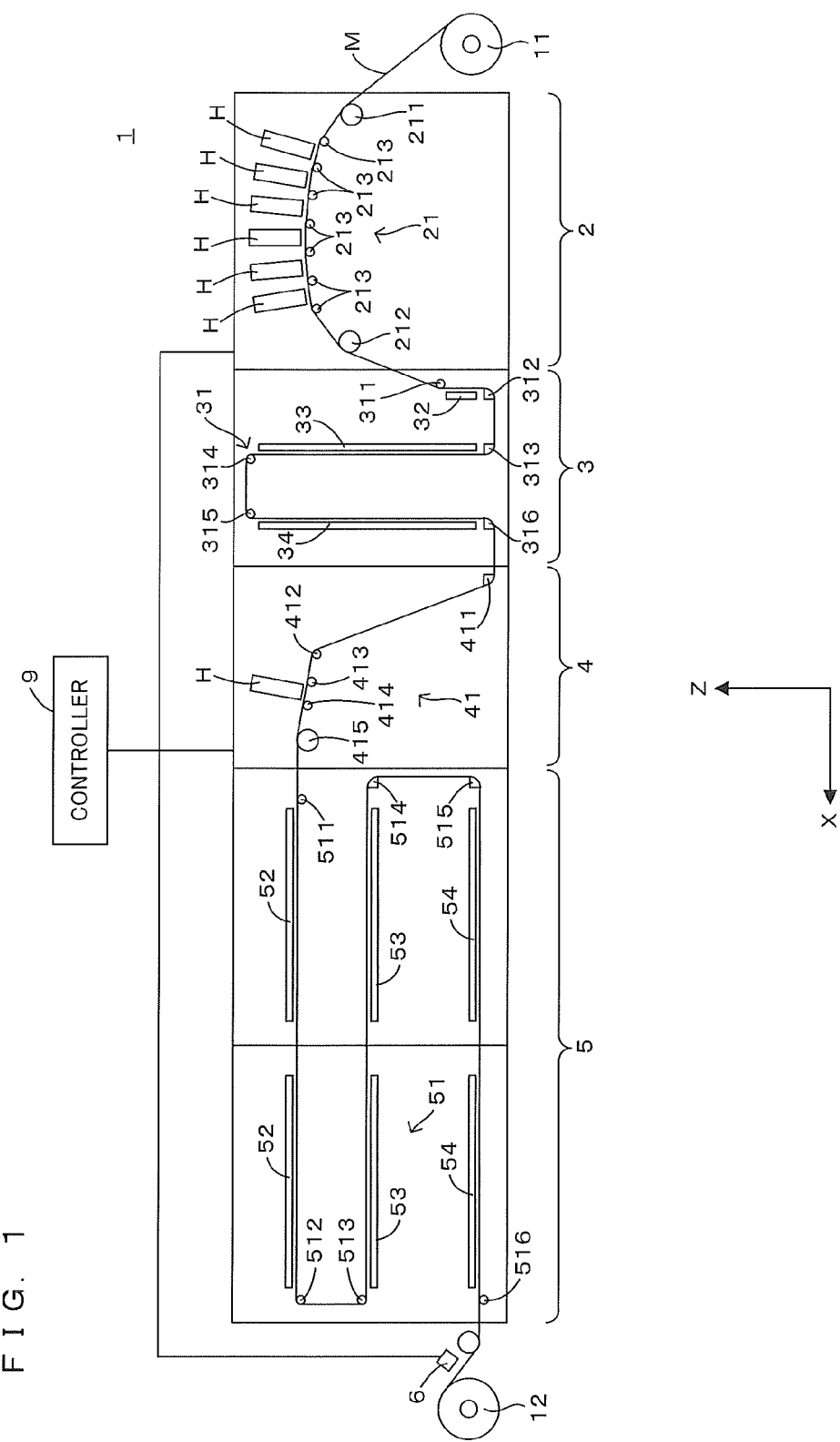
FIG. 1 is a front view schematically showing an example of a printing apparatus according to the invention.

FIG. 1 is a front view schematically showing an example of a printing apparatus according to the invention. In FIG. 1, a horizontal direction X and a vertical direction Z are shown as appropriate. As shown in FIG. 1, the printing apparatus 1 has a configuration with a printer 2, a dryer 3, a printer 4 and a dryer 5 arrayed in this order in the horizontal direction X (array direction). This printing apparatus 1 dries a printing medium M printed in the printer 2 in the dryer 3 and further dries the printing medium M printed in the printer 4 in the dryer 5 while the printing medium M in the form of an elongated belt is conveyed in a roll-to-roll manner from an unwinding roll 11 to a winding roll 12. Note that various materials such as paper or films can be utilized as the printing medium M. Further, out of both surfaces of the printing medium M, the surface on which images are to be printed is referred to as a front surface and the surface opposite to the front surface is referred to as a back surface as appropriate.

The printer 2 includes a conveyor 21 which conveys the printing medium M. The conveyor 21 includes a roller 211 to support the printing medium M loaded into the printer 2, a roller 212 to unload the printing medium M toward the dryer 3, and a plurality of rollers 213 arrayed between the rollers 211 and 212. These rollers 211, 212 and 213 support the printing medium M by being in contact with the downward facing back surface of the printing medium M. Further, the printer 2 includes a plurality of discharge heads H facing the front surface of the printing medium M, which is supported by the plurality of rollers 213, from above, and the plurality of discharge heads H print color images on the printing medium M by discharging ink of mutually different colors to the front surface of the printing medium M in an ink-jet method.

The dryer 3 includes a conveyor 31 which conveys the printing medium M unloaded from the printer 2. This conveyor 31 includes a roller 311 to support the printing medium M loaded in the dryer 3 and a pair of air turn bars 312, 313 arranged in the horizontal direction X below the roller 311. The air turn bar 312 bends the printing medium M descending from the roller 311 toward one side (left side of FIG. 1) in the horizontal direction X, and the air turn bar 313 bends the printing medium M moving in the horizontal direction X from the air turn bar 312 upward. Further, the conveyor 31 includes a pair of rollers 314, 315 arranged in the horizontal direction X above the pair of air turn bars 312, 313. The roller 314 bends the printing medium M ascending from the air turn bar 313 toward the one side in the horizontal direction X, and the roller 315 bends the printing medium M moving in the horizontal direction X from the roller 314 downward. Furthermore, the conveyor 31 includes an air turn bar 316 arranged below the roller 315. This air turn bar 316 bends the printing medium M descending from the roller 315 toward the one side in the horizontal direction X and unloads the printing medium M toward the printer 4. The rollers 311, 314 and 315 support the printing medium M by being in contact with the back surface of the printing medium M, and the air turn bars 312, 313 and 316 support the printing medium M by injecting air to the front surface of the printing medium M.

Further, the dryer 3 includes a heater 32 facing the front surface of the printing medium M between the roller 311 and the air turn bar 312, a heater 33 facing the front surface of the printing medium M between the air turn bar 313 and the roller 314, and a heater 34 facing the front surface of the printing medium M between the roller 315 and the air turn bar 316. These heaters 32, 33 and 34 dry the ink attached to the printing medium M by heating the front surface of the printing medium M.

The printer 4 includes a conveyor 41 which conveys the printing medium M unloaded from the dryer 3. This conveyor 41 includes an air turn bar 411 to bend the printing medium M loaded into the printer 4 upward, and rollers 412, 413, 414 and 415 arranged above the air turn bar 411. These rollers 412 to 415 convey the printing medium M ascending from the air turn bar 411 toward the one side in the horizontal direction X. In this way, the printing medium M is unloaded from the roller 415 toward the dryer 5 in the horizontal direction X. The air turn bar 411 supports the printing medium M by injecting air to the front surface of the printing medium M, and the rollers 412 to 415 support the printing medium M by being in contact with the downward facing back surface of the printing medium M. Further, the printer 4 includes a discharge head H facing the front surface of the printing medium M, which is supported by a plurality of the rollers 413, 414, from above, and the discharge head H prints white images on the printing medium M by discharging white ink to the front surface of the printing medium M by the ink-jet method.

The dryer 5 includes a conveyor 51 which conveys the printing medium M unloaded from the printer 4. The conveyor 51 includes a roller 511 to support the printing medium M loaded into the dryer 5, and a pair of rollers 512, 513 arranged in the vertical direction Z on one side in the horizontal direction X of the roller 511. The roller 512 bends the printing medium M conveyed toward the one side in the horizontal direction X from the roller 511 downward, and the roller 513 bends the printing medium descending from the roller 512 toward the other side (right side of FIG. 1) in the horizontal direction X. Further, the conveyor 51 includes a pair of air turn bars 514, 515 arranged in the vertical direction Z on the other side in the horizontal direction X of the roller 513 and below the roller 511. The air turn bar 514 bends the printing medium M conveyed toward the other side in the horizontal direction X from the roller 513 downward, and the air turn bar 515 bends the printing medium M descending from the air turn bar 514 toward the one side in the horizontal direction X. Further, the conveyor 51 includes a roller 516 arranged on one side in the horizontal direction X of the air turn bar 515, and the roller 516 conveys the printing medium M conveyed toward the one side in the horizontal direction from the air turn bar 515 further toward the one side. In this way, the printing medium M is unloaded toward the winding roll 12 from the roller 516. The rollers 511, 512, 513 and 516 support the printing medium M by being in contact with the back surface of the printing medium M, and the air turn bars 514, 515 support the printing medium M by injecting air to the front surface of the printing medium M.

Further, the dryer 5 includes heaters 52 facing the front surface of the printing medium M between the roller 511 and the roller 512, heaters 53 facing the front surface of the printing medium M between the roller 513 and the air turn bar 514, and heaters 54 facing the front surface of the printing medium M between the air turn bar 515 and the roller 516. These heaters 52, 53 and 54 dry the ink attached to the printing medium M by heating the front surface of the printing medium M.

Figure 2:
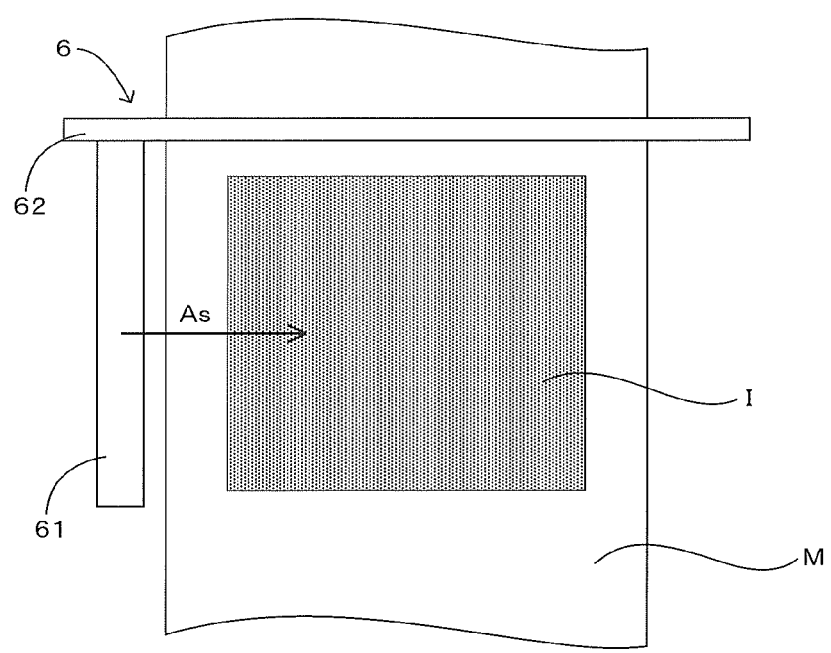
FIG. 2 is a plan view schematically showing the configuration of the imager.

Further, the printing apparatus 1 includes an imager 6 which reads an image printed on the printing medium M before being wound on the winding roll 12 after being unloaded from the dryer 5. FIG. 2 is a plan view schematically showing the configuration of the imager. The imager 6 includes a scanner 61 which reads an object, for example, by a line sensor and a scan driver 62 which drives the scanner 61 in a scanning direction As equivalent to a width direction of the printing medium M. The scan driver 62 is a linear mechanism such as a ball screw. Such an imager 6 reads an entire image I by driving the scanner 61 in the scanning direction As by the scan driver 62 while reading the image I printed on the printing medium M line by line by the scanner 61. Images to be read by the imager 6 include solid images (defect detection images) for detecting a defective nozzle and test images for measuring a variation (shading) of an ink discharge amount of each nozzle of the discharge head H.

Further, the printing apparatus 1 includes a controller 9 which controls the discharge of the ink from the discharge head H based on an image read by the imager 6. The controller 9 is, for example, constituted by a FPGA (Field-Programmable Gate Array), a processor or the like. Particularly, the controller 9 executes a control of complementing an ink discharge defect occurring in the discharge head H. Next, this point is described.

Figure 3:
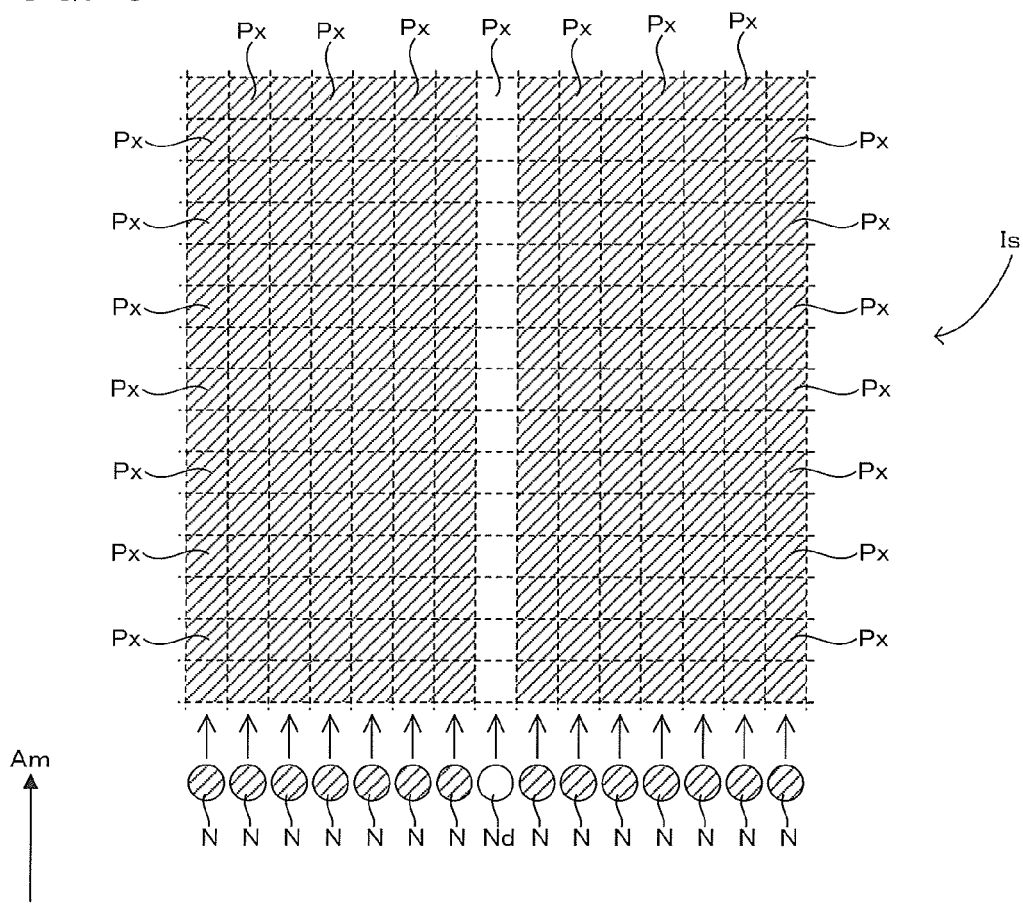
FIG. 3 is a diagram schematically showing an ink discharge defect occurring in the discharge head.

FIG. 3 is a diagram schematically showing an ink discharge defect occurring in the discharge head and specifically shows a so-called solid image Is printed by simultaneously driving all the plurality of nozzles N of the discharge head H while conveying the printing medium M in a conveying direction Am. An image printed by the ink discharged from the nozzles N is composed of a plurality of pixels Px two-dimensionally arrayed, and each nozzle N is associated with the pixels Px, for which the nozzle N is in charge of ink discharge. Specifically, one nozzle N is in charge of ink discharge to the pixels Px of one row arranged in the conveying direction Am. The nozzle N successively discharges the ink to the pixels in charge according to the conveyance of the printing medium M in the conveying direction Am. Thus, if a defective nozzle Nd occurs, out of the plurality of nozzles N, the ink is not landed on each pixel Px, for which the defective nozzle Nd is in charge of ink discharge, and a white streak extending in the conveying direction Am appears in the solid image Is. Accordingly, the controller 9 generates shading correction tables (lock-up tables) as follows to complement for a discharge defect.

Figure 4:
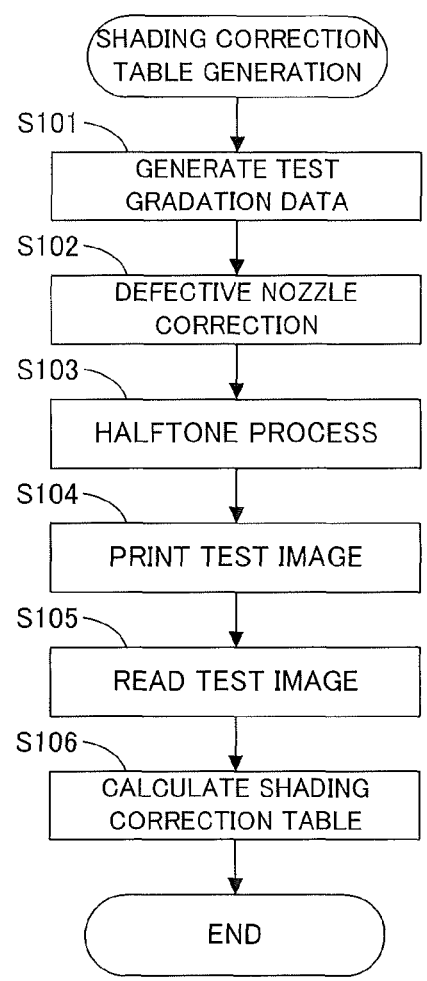
FIG. 4 is a flow chart showing an example of a method for generating the shading correction tables.
Figure 5:
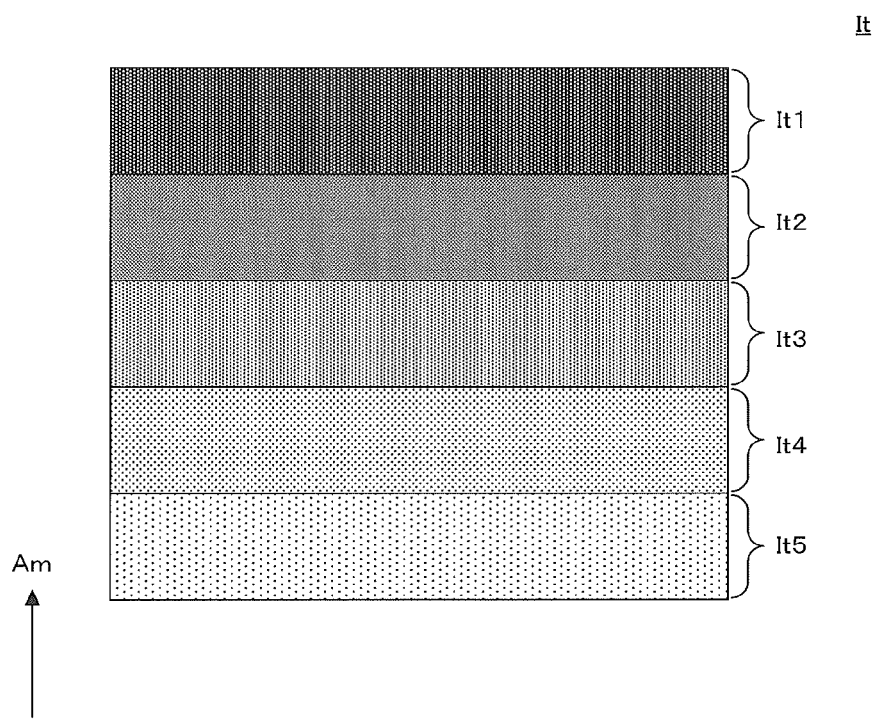
FIG. 5 is a diagram showing an example of a test image to be printed in the flow chart of FIG. 4.

FIG. 4 is a flow chart showing an example of a method for generating the shading correction tables, and FIG. 5 is a diagram showing an example of a test image to be printed in the flow chart of FIG. 4. In Step S101, test gradation data, which is data representing a test image It, is generated (test gradation data preparation step). This test gradation data is data representing the test image It by showing a dot percentage of each of the plurality of pixels two-dimensionally arrayed. Here, the dot percentage is a value indicating a gradation value of the pixel by a percentage. For example, if the gradation value is expressed in 256 gradation levels, a dot percentage of 100% indicates that the gradation value is 256 and a dot percentage of 50% indicates that the gradation value is 128. As shown in FIG. 5, the test image It includes a plurality of regions It1 to It5 arranged in the conveying direction Am of the printing medium M. Each of the regions It1 to It5 has a uniform dot percentage, whereas the dot percentage decreases in the order of the regions It1 to It5. Note that the number of the regions It1 to It5 is not limited to that in this example.

Figure 6:
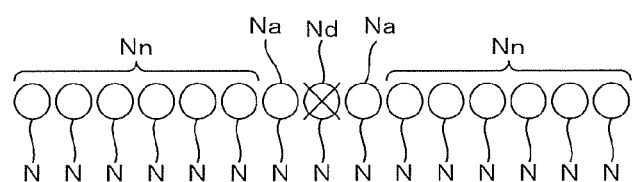
FIG. 6 is a diagram schematically showing a mode of distinguishing the nozzles in the defective nozzle correction.
Figure 7:
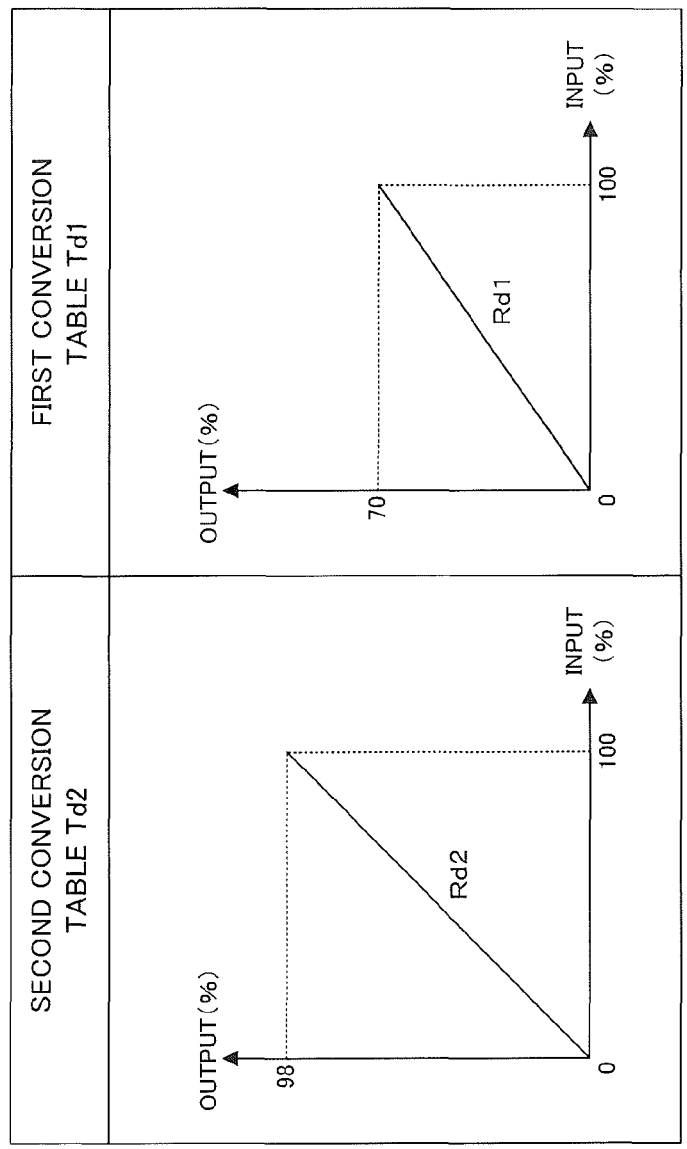
FIG. 7 is a chart showing examples of conversion tables used in the defective nozzle correction.

In Step S102, a defective nozzle correction is performed for the test gradation data representing this test image It. FIG. 6 is a diagram schematically showing a mode of distinguishing the nozzles in the defective nozzle correction, and FIG. 7 is a chart showing examples of conversion tables used in the defective nozzle correction. As shown in FIG. 6, the plurality of nozzles N of the discharge head H are distinguished into a defective nozzle Nd, surrounding nozzles Na and normal nozzles Nn in the defective nozzle correction. Here, the defective nozzle Nd is the nozzle N having an ink discharge defect. The surrounding nozzles Na are the nozzles N surrounding the defective nozzle Nd. Particularly in this example, each of two nozzles N on both sides of the defective nozzle Nd and adjacent to the defective nozzle Nd is the surrounding nozzle Na. Note that the nozzles N adjacent to the target nozzle N (here, the defective nozzle Nd) are the nozzles N in charge of ink discharge to the pixels Px adjacent to the pixel, for which the target nozzle N is in charge of ink discharge. Further, the normal nozzles Nn are the nozzles N other than the defective nozzle Nd and the surrounding nozzles Na. The surrounding nozzles Na and the normal nozzles Nn have no ink discharge defect and discharge the ink as being driven by the controller 9.

Incidentally, the defective nozzle Nd is detected in advance before the start of the flow chart of FIG. 4. In this detection of the defective nozzle Nd, the solid image Is is printed on the printing medium M and the imager 6 reads the solid image Is. Then, the controller 9 detects the defective nozzle Nd from the position of a white streak included in the solid image Is read by the imager 6 and holds a detection result of the defective nozzle Nd (defective nozzle detection step). Note that the defective nozzle Nd does not indicate only a case where the ink is not discharged from this nozzle Nd at all. That is, the defective nozzle Nd indicates, for example, cases where an ink discharge state is improper such as a case where the amount of the ink discharged from this nozzle is clearly reduced and a case where a discharge direction from this nozzle is changed so that the ink is not discharged to a position to which the ink should be originally discharged.

Then, the dot percentage of each pixel Px, for which the normal nozzles Nn are in charge of ink discharge, is converted by a first conversion table Td1. This first conversion table Td1 converts an input into an output by outputting a value obtained by multiplying the dot percentage (input) represented by the test gradation data by a first rate Rd1 (here, 70%) lower than 100%. Thus, the dot percentages of the pixels Px, for which the normal nozzles Nn are in charge of the ink discharge, out of the plurality of pixels Px included in the test gradation data, are converted into the values obtained by multiplying the dot percentages by 70%, which is the first rate Rd1.

Further, the dot percentage of each pixel Px, for which the surrounding nozzles Na are in charge of ink discharge, is converted by a second conversion table Td2. This second conversion table Td2 converts an input into an output by outputting a value obtained by multiplying the dot percentage (input) represented by the test gradation data by a second rate Rd2 (here, 98%) lower than 100% and higher than the first rate Rd1. Thus, the dot percentages of the pixels Px, for which the surrounding nozzles Na are in charge of the ink discharge, out of the plurality of pixels Px included in the test gradation data, are converted into the values obtained by multiplying the dot percentages by 98%, which is the second rate Rd2.

As just described, in the defective nozzle correction, the test gradation data is converted into defect complemented test gradation data by multiplying the dot percentage of each pixel Px, for which the normal nozzles Nn are in charge of ink discharge, by the first rate Rd1, and multiplying the dot percentage of each pixel Px, for which the surrounding nozzles Na are in charge of ink discharge, by the second rate Rd2 (test conversion step). Incidentally, the dot percentage of the pixel Px, for which the defective nozzle Nd is in charge of ink discharge, is set to zero in this conversion.

In Step S103, a halftone process is performed for the defect complemented test gradation data. In this way, the defect complemented test gradation data representing the dot percentage of each pixel is converted into test discharge control data representing whether or not the ink is to be discharged to each pixel (test halftone step). Then, in Step S104, the controller 9 prints the test image It on the printing medium M by the ink discharged from the nozzles N by driving the nozzles N of the discharge head H based on the test discharge control data (test image printing step).

In Step S105, the controller 9 reads a density (in other words, gradation values) of the test image It printed on the printing medium M by the imager 6. Specifically, a density change along the pixels Px of one line, for which the nozzle N is in charge of ink discharge, is read for each nozzle (gradation value reading step). Then, an outputtable maximum density of the nozzle N having a lowest maximum density, out of the respective nozzles N, is set as an upper limit of a dynamic range. Here, the dynamic range is equivalent to a width in which the density is changed for gradation expression. In this dynamic range, the shading correction table representing a density change for an input dot percentage is calculated for each nozzle N based on a reading result in Step S105 (correction rule generation step).

Figure 8:
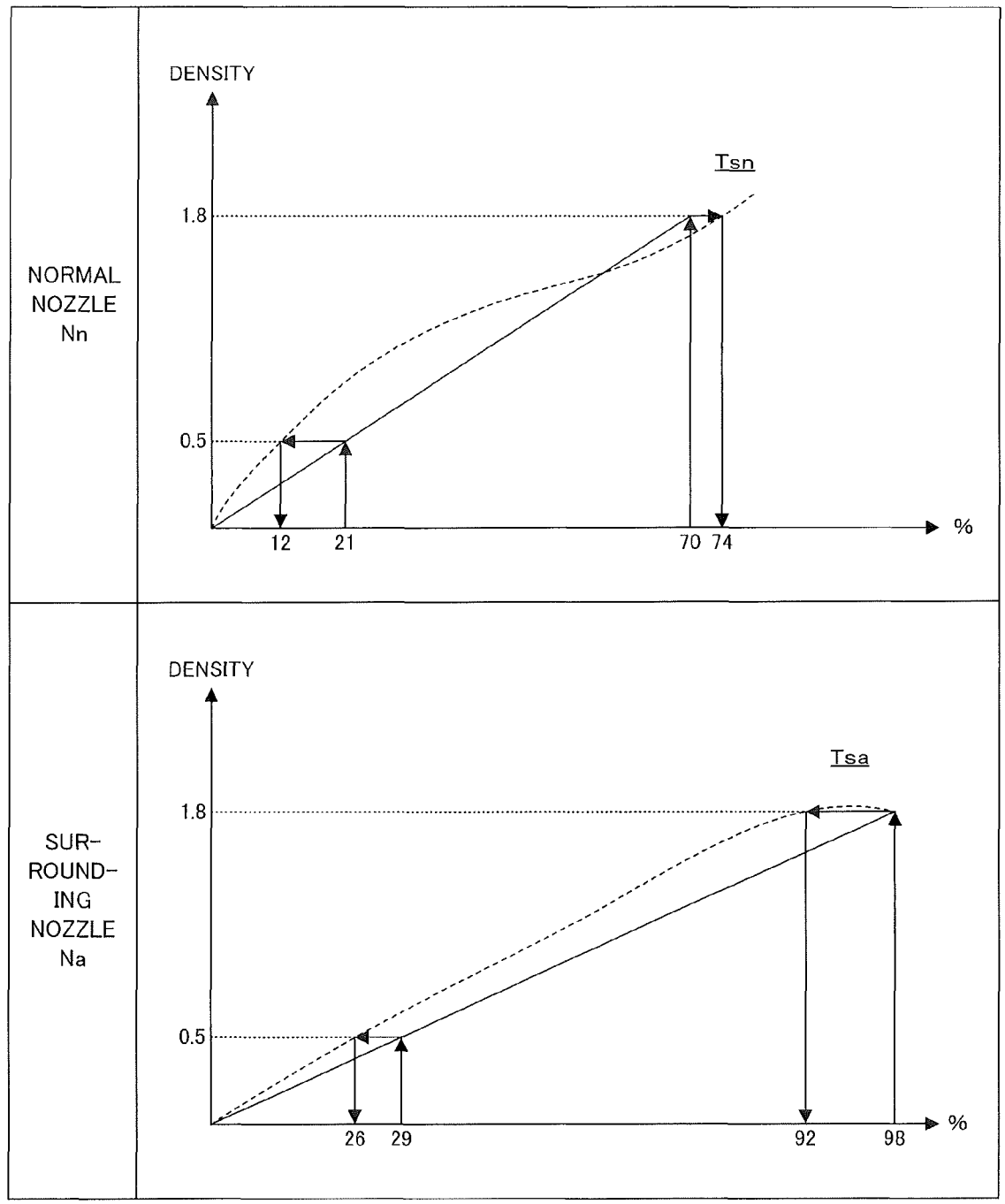
FIG. 8 is a chart schematically showing examples of the shading correction table.

FIG. 8 is a chart schematically showing examples of the shading correction table. In a field "Normal Nozzle Nn" of FIG. 8, a shading correction table Tsn obtained for one normal nozzle Nn is shown. A broken-line curve represents a measurement result of a correspondence relationship of the dot percentage and the density, and a solid straight line is a reference line representing a linear correspondence relationship of the dot percentage and the density. For example, a density of 1.8 should be obtained for a dot percentage of 70% according to the reference line, but an actually measured density is lower than 1.8 and a dot percentage of 74% needs to be given to obtain the density of 1.8. Further, a density of 0.5 should be obtained for a dot percentage of 21% according to the reference line, but an actually measured density is higher than 0.5 and a dot percentage of 12% needs to be given to obtain the density of 0.5. In this way, the shading correction table Tsn performs a dot percentage correction for the input dot percentage such as the conversion of 70% to 74% and the conversion of 21% to 12% (shading correction).

Further, in a field "Surrounding Nozzle Na" of FIG. 8, a shading correction table Tsa obtained for one surrounding nozzle Na is shown. A broken-line curve represents a measurement result of a correspondence relationship of the dot percentage and the density, and a solid straight line is a reference line representing a linear correspondence relationship of the dot percentage and the density. For example, a density of 1.8 should be obtained for a dot percentage of 98% according to the reference line, but a dot percentage of 92% needs to be given to obtain the density of 1.8 based on an actual measurement result. Further, a density of 0.5 should be obtained for a dot percentage of 29% according to the reference line, but a dot percentage of 26% needs to be given to obtain the density of 0.5 based on an actual measurement result. In this way, the shading correction table Tsa performs a dot percentage correction for the input dot percentage such as the conversion of 98% to 92% and the conversion of 29% to 26% (shading correction).

Incidentally, as understood from the comparison of the shading correction table Tsn and the shading correction table Tsa, larger dot percentages need to be input for the surrounding nozzles Na than for the normal nozzles Nn to obtain the same density. This is because a discharge defect of the defective nozzle Nd adjacent to the surrounding nozzles Na is complemented by the surrounding nozzles Na.

FIG. 9A is a table showing numerical value examples of the dot percentages converted by the defective nozzle correction and the shading correction for the normal nozzle for the normal nozzle, and FIG. 9B is a table showing numerical value examples of the dot percentages converted by the defective nozzle correction and the shading correction for the defective nozzle. As shown in FIG. 9A, data representing the gradation value of each pixel by the input dot percentage of 0 to 100% is converted into data representing the gradation value of each pixel by the dot percentage of 0 to 70% by the first conversion table Td1 and further converted into data representing the gradation value of each pixel by the dot percentage of 0 to 74% by the shading correction table Tsn. Further, as shown in FIG. 9B, data representing the gradation value of each pixel by the input dot percentage of 0 to 100% is converted into data representing the gradation value of each pixel by the dot percentage of 0 to 98% by the second conversion table Td2 and further converted into data representing the gradation value of each pixel by the dot percentage of 0 to 92% by the shading correction table Tsa.

Note that the shading correction table Tsn is individually calculated for each normal nozzle Nn, and the shading correction table Tsa is individually calculated for each surrounding nozzle Na. That is, the shading correction table is obtained for each nozzle N other than the defective nozzle Nd. The following image printing is performed using each shading correction table Tsn, Tsa obtained while the defective nozzle correction (Step S102) is performed in this way. Next, this point is described.

Figure 10:
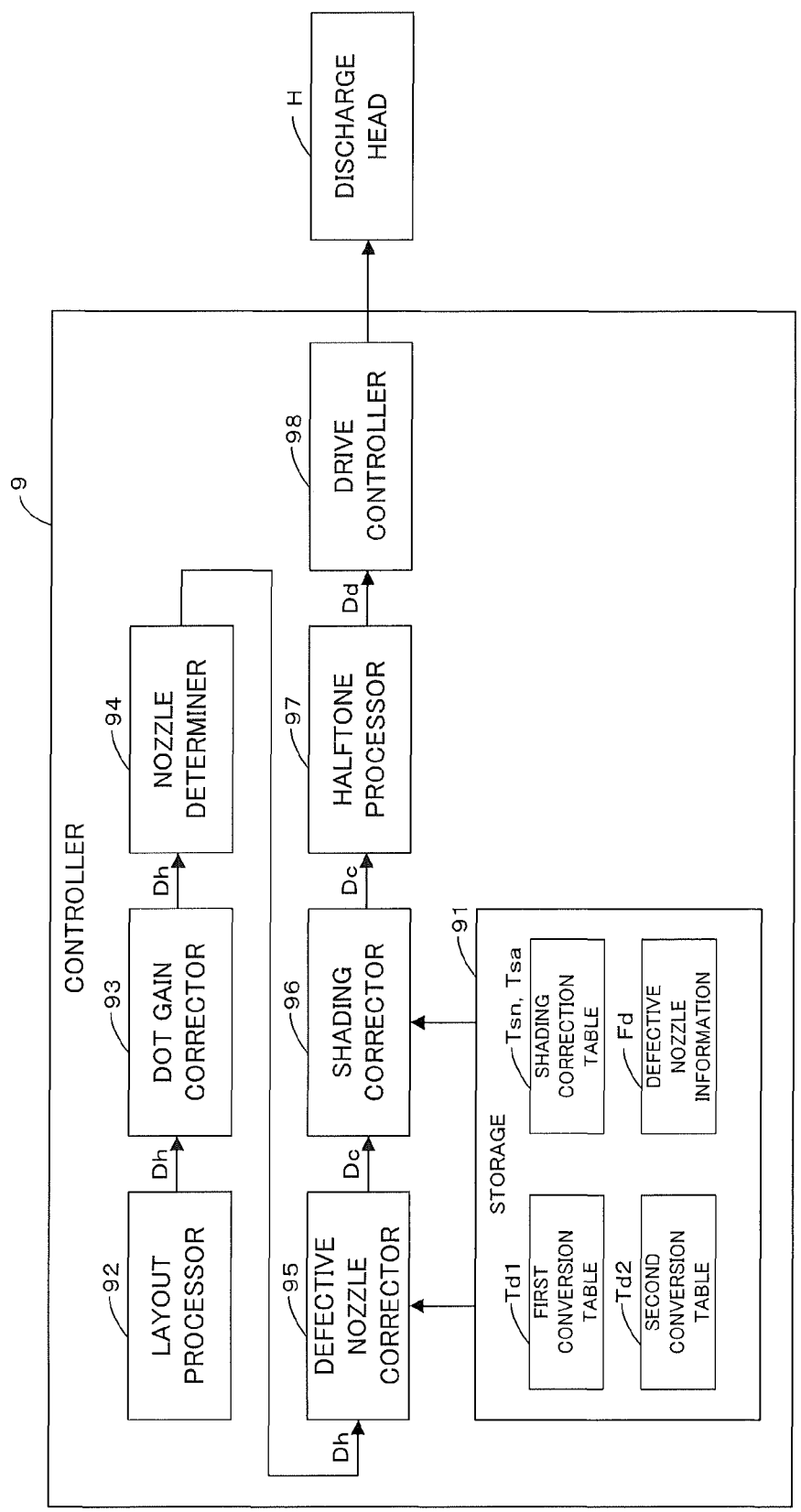
FIG. 10 is a block diagram showing an electrical configuration of the controller.

FIG. 10 is a block diagram showing an electrical configuration of the controller. The controller 9 includes a storage 91 to store data, and stores defective nozzle information Fd, the first conversion table Td1, the second conversion table Td2 and the shading correction tables Tsn, Tsa. The defective nozzle information Fd is information representing the defective nozzle Nd, out of the nozzles N of the discharge head H, and obtained based on the result obtained by reading the solid image Is as described above. Further, the first and second conversion tables Td1, Td2 are used in the above defective nozzle correction (Step S102). Furthermore, the shading correction tables Tsn, Tsa are obtained by the above calculation of the shading correction tables (Step S106).

Further, the controller 9 includes a layout processor 92, a dot gain corrector 93 and a nozzle determiner 94. The layout processor 92 determines the arrangement of print images to be printed on the printing medium M and generates gradation data Dh representing the dot percentage of each of the plurality of pixels Px constituting these print images (gradation data obtaining step). The dot gain corrector performs a dot gain correction for the gradation data Dh. The nozzle determiner 94 determines the nozzles N in charge of ink discharge to the respective pixels Px constituting the gradation data Dh.

Furthermore, the controller 9 includes a defective nozzle corrector 95 and a shading corrector 96. The defective nozzle corrector 95 performs the defective nozzle correction for the gradation data Dh having the dot gain correction performed therefor. An operation performed in this defective nozzle correction is the same as in the defective nozzle correction in Step S102. That is, the defective nozzle information Fd, the first conversion table Td1 and the second conversion table Td2 are read from the storage 91 to the defective nozzle corrector 95. Then, the defective nozzle Nd is specified based on the defective nozzle information Fd, and the two surrounding nozzles Na adjacent to the defective nozzle Nd and the normal nozzles Nn other than these are distinguished. Then, the dot percentages of the pixels Px, for which the normal nozzles Nn are in charge of ink discharge, are converted by being multiplied by the first rate Rd1 of the first conversion table Td1, and the dot percentages of the pixels Px, for which the surrounding nozzles Na are in charge of ink discharge, are converted by being multiplied by the second rate Rd2 of the second conversion table Td2, whereby the gradation data Dh is converted into defect complemented gradation data Dc (conversion step).

The shading corrector 96 performs the shading correction for the defect complemented gradation data Dc output from the defective nozzle corrector 95. That is, the shading correction tables Tsn, Tsa are read from the storage 91 to the shading corrector 96. Then, the dot percentages of the pixels Px, for which the normal nozzles Nn are in charge of ink discharge, are converted by the shading correction table Tsn, and the dot percentages of the pixels Px, for which the surrounding nozzles Na are in charge of ink discharge, are converted by the shading correction table Tsa, whereby the shading correction is performed for the defect complemented gradation data Dc (shading correction step). In this way, a variation of the amount of the ink discharged by each nozzle N other than the defective nozzle Nd is corrected.

Further, the controller 9 includes a halftone processor 97 and a drive controller 98. The halftone processor 97 performs a halftone process for the defect complemented gradation data Dc having the shading correction performed therefor (halftone step). By this halftone process, the defect complemented gradation data Dc representing the dot percentage of each pixel Px is converted into discharge control data Dd representing whether or not the ink is to be discharged to each pixel Px. Then, the drive controller 98 prints an image on the printing medium M by driving the nozzles N of the discharge head H based on the discharge control data Dd (image printing step).

In the embodiment described above, the conversion of the dot percentages (gradation value) using the first conversion table Td1 (first conversion rule) and the second conversion table Td2 (second conversion rule) is performed for the gradation data Dh representing the dot percentage of each of the plurality of pixels Px constituting the print image by the defective nozzle corrector 95. Here, the first conversion table Td1 converts the dot percentages of the pixels Px corresponding to the normal nozzles Nn having no discharge defect by the first rate Rd1 lower than 100%, and the second conversion table Td2 converts the dot percentages of the pixels Px corresponding to the surrounding nozzles Na located around the defective nozzle Nd by the second rate Rd2 higher than the first rate Rd1. The second rate Rd2 is determined based on an original dot percentage of the pixel Px corresponding to the defective nozzle Nd. Then, the shading correction is performed for the defect complemented gradation data Dc obtained by converting the dot percentages in this way by the shading corrector 96. Therefore, the discharge defect of the defective nozzle Nd can be complemented by substantially adding the dot percentages of the pixels Px corresponding to the surrounding nozzles Na compared to the dot percentages of the pixels Px corresponding to the normal nozzles Nn. In this way, the defective nozzle Nd can be dealt with by a simple control.

Further, there is the following advantage since the defective nozzle Nd is dealt with by operating the dot percentages before the halftone process by the halftone processor 97 is performed. That is, the halftone process adjusts the discharge of the ink to the pixels Px based on the dot percentage of an entire area wider than the pixel Px corresponding to the surrounding nozzle Na. Thus, even if the dot percentage of the pixel Px corresponding to the surrounding nozzle Na is substantially added, it does not mean that the amount of the ink discharged from the surrounding nozzle Na is directly increased, but the discharge of the ink from the surrounding nozzle Na is adjusted according to the dot percentage in the entire area including the pixel Px corresponding to the surrounding nozzle Na. Therefore, a more natural image can be printed.

Further, the defective nozzle information Fd representing the defective nozzle Nd is obtained in advance before the defective nozzle correction by the defective nozzle corrector 95. Specifically, the solid image Is (defect detection image) is printed on the printing medium M by the ink discharged from the nozzles N by driving the plurality of nozzles N of the discharge head H. Then, the defective nozzle Nd is detected, out of the plurality of nozzles N, based on the result obtained by reading the solid image Is by the imager 6 (defective nozzle detection step). By detecting such a defective nozzle Nd before the defective nozzle correction, the occurrence of the defective nozzle Nd can be precisely grasped and dealt with.

Further, before the image is printed on the printing medium M by the configuration of the block diagram shown in FIG. 10, the shading correction table generation of FIG. 4 is performed. That is, the test image It including the plurality of regions It1 to It5 having mutually different dot percentages is actually printed and the shading correction tables Tsn, Tsa (shading correction rules) used in the shading correction are generated based on a result obtained by reading the dot percentages of this test image It. At this time, the test image It is printed after the conversion using the first and second conversion tables Td1, Td2 is performed for the test gradation data representing the dot percentage of each of the plurality of pixels Px constituting the test image It. Thus, the shading correction can be performed using the test image It having the discharge defect of the defective nozzle Nd complemented. As a result, the proper shading correction tables Tsn, Tsa can be generated.

Figure 11:
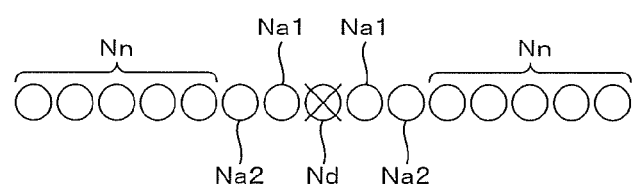
FIG. 11 is a diagram schematically showing a modification of the mode of distinguishing the nozzles in the defective nozzle correction.
Figure 12:
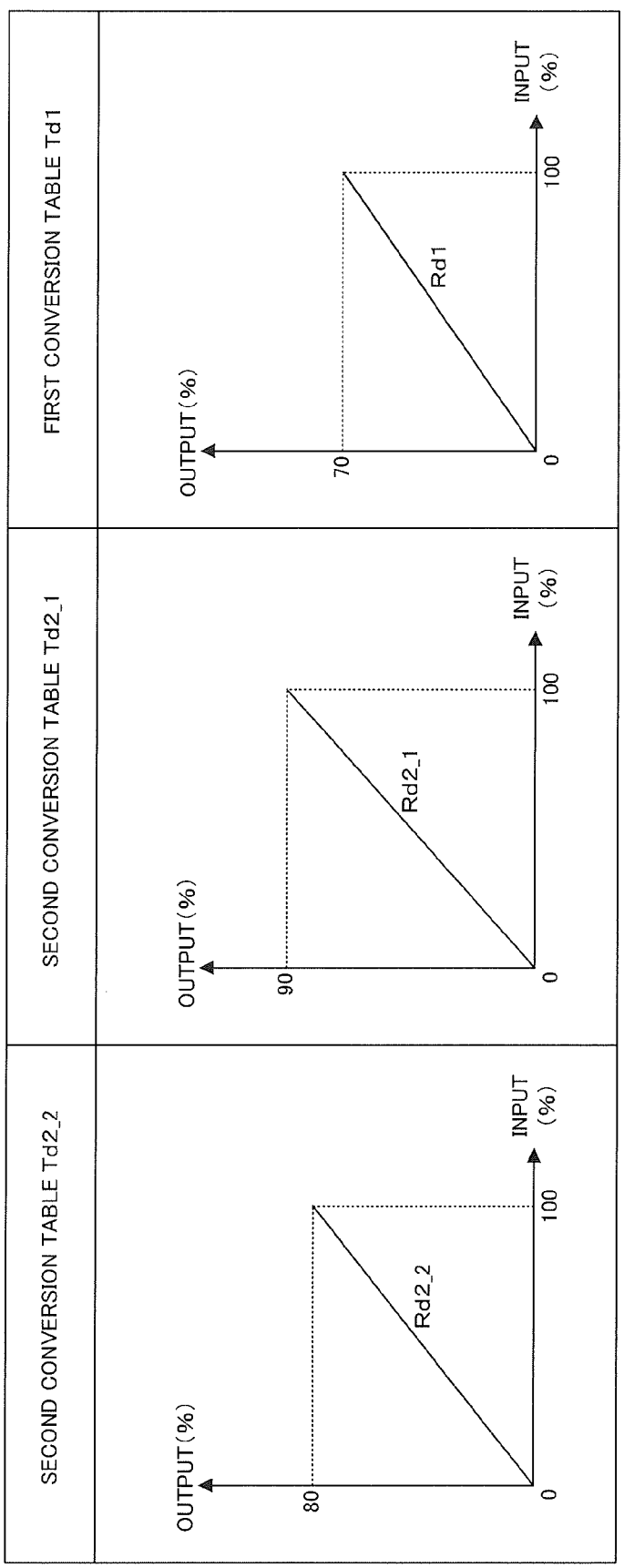
FIG. 12 is a chart showing examples of conversion tables corresponding to the modification of FIG. 11.

In the above embodiment, the nozzles N adjacent to the defective nozzle Nd are distinguished as the surrounding nozzles Na. However, an example of the surrounding nozzles Na is not limited to this. FIG. 11 is a diagram schematically showing a modification of the mode of distinguishing the nozzles in the defective nozzle correction, and FIG. 12 is a chart showing examples of conversion tables corresponding to the modification of FIG. 11.

In an example shown in FIG. 11, a plurality of nozzles N of the discharge head H are distinguished into a defective nozzle Nd, primary adjacent nozzles Na1, secondary adjacent nozzles Na2 and normal nozzles Nn. Here, the primary adjacent nozzles Na1 and the secondary adjacent nozzles Na2 are types of the surrounding nozzles Na. Particularly, the primary adjacent nozzles Na1 are the nozzles N adjacent to the defective nozzle Nd, and the secondary adjacent nozzles Na2 are the nozzles adjacent to the primary adjacent nozzles Na1 on sides opposite to the defective nozzle Nd. As shown in FIG. 12, the defective nozzle correction is performed by conversion tables Td1, Td2_1 and Td2_2 respectively provided for the normal nozzles Nn, the primary adjacent nozzles Na1 and the secondary adjacent nozzles Na2 (Step S102, defective nozzle corrector 95).

That is, the dot percentage of each pixel Px, for which the normal nozzles Nn are in charge of ink discharge, is converted by the first conversion table Td1. This first conversion table Td1 converts an input into an output by outputting a value obtained by multiplying the dot percentage (input) represented by the gradation data (gradation data Dh or test gradation data) by the first rate Rd1 (here, 70%) lower than 100%. Thus, the dot percentages of the pixels Px, for which the normal nozzles Nn are in charge of the ink discharge, out of the plurality of pixels Px included in the gradation data, are converted into the values obtained by multiplying the dot percentages by 70%, which is the first rate Rd1.

Further, the dot percentage of each pixel Px, for which the primary adjacent nozzles Na1 are in charge of ink discharge, is converted by the second conversion table Td2_1. This second conversion table Td2_1 converts an input into an output by outputting a value obtained by multiplying the dot percentage (input) represented by the gradation data (gradation data Dh or test gradation data) by the second rate Rd2_1 (here, 90%) lower than 100% and higher than the first rate Rd1. Thus, the dot percentages of the pixels Px, for which the primary adjacent nozzles Na1 are in charge of the ink discharge, out of the plurality of pixels Px included in the gradation data, are converted into the values obtained by multiplying the dot percentages by 90%, which is the second rate Rd2_1.

Further, the dot percentage of each pixel Px, for which the secondary adjacent nozzles Na2 are in charge of ink discharge, is converted by the second conversion table Td2_2. This second conversion table Td2_2 converts an input into an output by outputting a value obtained by multiplying the dot percentage (input) represented by the gradation data (gradation data Dh or test gradation data) by the second rate Rd2_2 (here, 80%) higher than the first rate Rd1 and lower than the second rate Rd2_1. Thus, the dot percentages of the pixels Px, for which the secondary adjacent nozzles Na2 are in charge of the ink discharge, out of the plurality of pixels Px included in the gradation data, are converted into the values obtained by multiplying the dot percentages by 80%, which is the second rate Rd2_2.

That is, in this modification, the second conversion tables Td2_1, Td2_2 (second conversion rules) are respectively provided for the primary adjacent nozzles Na1 and the secondary adjacent nozzles Na2 of the defective nozzle Nd. The second conversion table Td2_1 converts the dot percentages of the pixels Px corresponding to the primary adjacent nozzles Na1 by the second rate Rd2_1 (primary adjacent rate), and the second conversion table Td2_2 converts the dot percentages of the pixels Px corresponding to the secondary adjacent nozzles Na2 by the second rate Rd2_2 (secondary adjacent rate) lower than the second rate Rd2_1. Note that the second rate Rd2_1 and the second rate Rd2_2 are determined based on an original dot percentage of the pixel Px corresponding to the defective nozzle Nd. In such a configuration, the discharge defect of the defective nozzle Nd can be complemented by substantially adding the dot percentages of the pixels Px corresponding to the primary adjacent nozzles Na1 and the secondary adjacent nozzles Na2 of the defective nozzle Nd. In addition, an addition rate of the dot percentage is lower for the pixels Px corresponding to the secondary adjacent nozzles Na2 than for the pixels Px corresponding to the primary adjacent nozzles Na1 and decreases with distance from the pixel Px corresponding to the defective nozzle Nd. Therefore, the discharge defect of the defective nozzle Nd can be more naturally complemented.

In the embodiment described above, the printing apparatus 1 corresponds to an example of a "printing apparatus" of the invention, the storage 91 corresponds to an example of a "storage" of the invention, the layout processor 92 corresponds to an example of a "gradation data acquisitor" of the invention, the defective nozzle corrector 95 corresponds to an example of a "data converter" of the invention, the shading corrector 96 corresponds to an example of a "shading corrector" of the invention, the halftone processor 97 corresponds to an example of a "halftone processor" of the invention, the drive controller 98 corresponds to an example of a "drive controller" of the invention, the defect complemented gradation data Dc corresponds to an example of "defect complemented gradation data" of the invention, the discharge control data Dd corresponds to an example of "discharge control data" of the invention, the gradation data Dh corresponds to an example of "gradation data" of the invention, the discharge head H corresponds to an example of a "discharge head" of the invention, the nozzles N correspond to an example of "nozzles" of the invention, the surrounding nozzles Na, the primary adjacent nozzles Na1 and the secondary adjacent nozzles Na2 correspond to examples of "surrounding nozzles" of the invention, the defective nozzle Nd corresponds to an example of a "defective nozzle" of the invention, the normal nozzles Nn correspond to an example of "normal nozzles" of the invention, the pixels Px correspond to an example of "pixels" of the invention, the first rate Rd1 corresponds to an example of a "first rate" of the invention, the second rates Rd2, Rd2_1 and Rd2_2 correspond to examples of a "second rate" of the invention, the second rate Rd2_1 corresponds to an example of a "primary adjacent rate" of the invention, the second rate Rd2_2 corresponds to an example of a "secondary adjacent rate" of the invention, the first conversion table Td1 corresponds to an example of a "first conversion rule" of the invention, the second conversion tables Td2, Td2_1 and Td2_2 correspond to examples of a "second conversion rule" of the invention.

Note that the invention is not limited to the above embodiment and various changes other than the aforementioned ones can be made without departing from the gist of the invention. For example, in the above embodiment, the shading corrector 96 performs the shading correction for the defect complemented gradation data Dc obtained by performing the defective nozzle correction for the gradation data Dh by the defective nozzle corrector 95. However, an execution sequence of these may be reversed.

Figure 13:
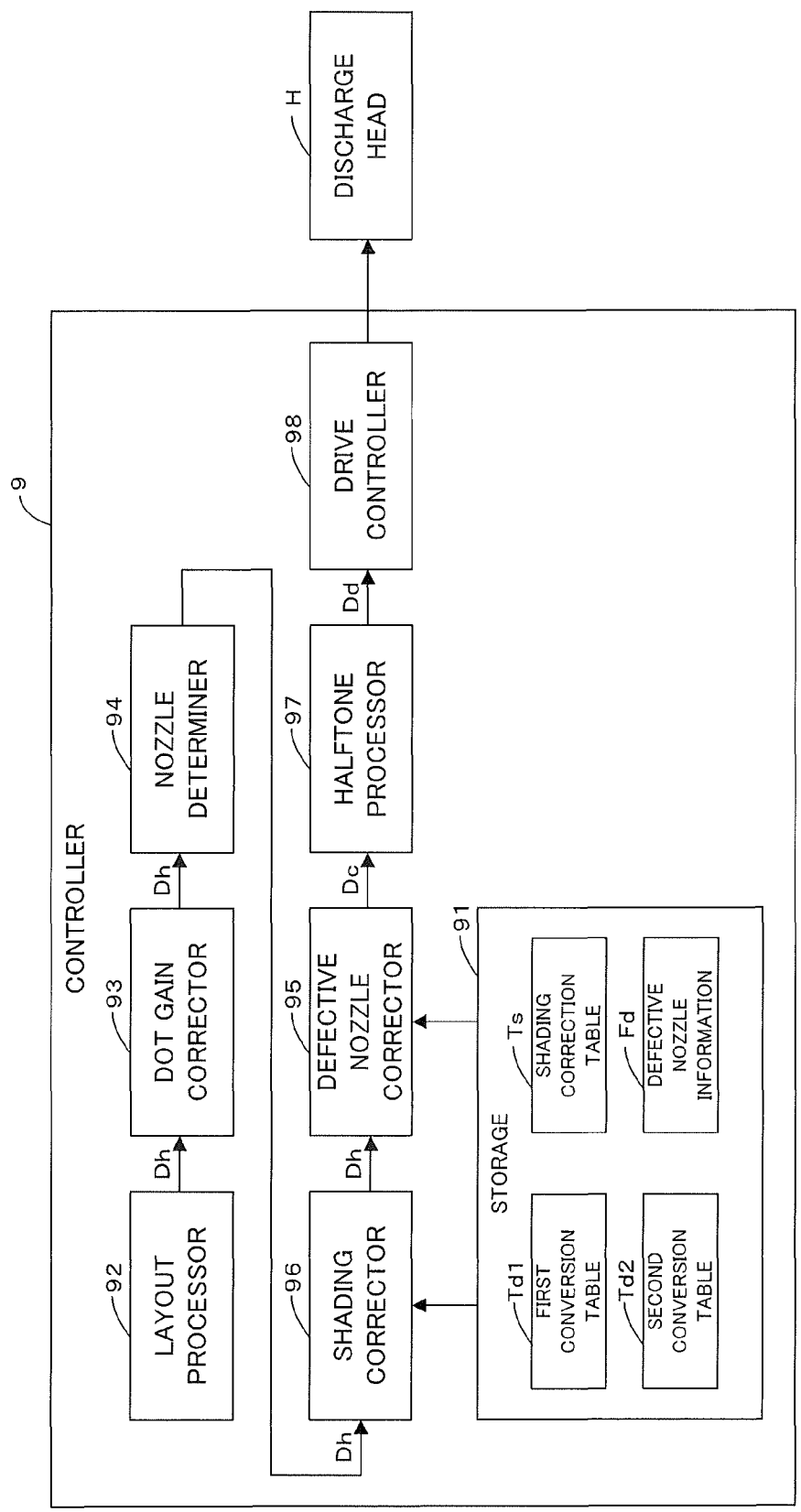
FIG. 13 is a block diagram showing a modification of the electrical configuration of the controller.

FIG. 13 is a block diagram showing a modification of the electrical configuration of the controller. Since a difference from the example of FIG. 10 is only a sequence of the defective nozzle corrector 95 and the shading corrector 96, description is centered on this difference here and common components are denoted by corresponding reference signs and not described.

In this modification, the shading corrector 96 performs the shading correction for the gradation data Dh based on a shading correction table Ts (shading correction step). This shading correction table Ts is calculated in advance by shading correction table generation similar to that of FIG. 4 and stored in the storage 91 in a state before the defective nozzle Nd occurs. However, since the defective nozzle Nd has not yet occurred, the defective nozzle correction of Step S102 is not performed.

Note that it is assumed that the defective nozzle Nd has not yet occurred when the shading correction table is generated, whereas the defective nozzle Nd occurs when an image is printed by the configuration of FIG. 13. To deal with the defective nozzle Nd having occurred in this way, the defective nozzle correction is performed, following the shading correction. That is, the defective nozzle corrector 95 performs the defective nozzle correction for the gradation data Dh having the shading correction performed by the shading corrector 96 as described above using the first and second conversion tables Td1, Td2 to convert the gradation data Dh into the defect complemented gradation data Dc (conversion step).

In such a modification, the shading correction is performed for the gradation data Dh representing the dot percentage of each of the plurality of pixels Px constituting the print image. Then, the dot percentages are converted for the gradation data Dh having the shading correction performed in this way, using the first and second conversion tables Td1, Td2. Therefore, the discharge defect of the defective nozzle Nd can be complemented by substantially adding the dot percentages of the pixels Px corresponding to the surrounding nozzles Na compared to the dot percentages of the pixels Px corresponding to the normal nozzles Nn. In this way, the defective nozzle Nd can be dealt with by a simple control.

Further, since the defective nozzle Nd is dealt with by operating the dot percentages before the halftone process by the halftone processor 97 is performed, a more natural image can be printed in a manner similar to the above.

Furthermore, modifications other than these are also possible. For example, the defective nozzle information Fd representing the defective nozzle Nd needs not be obtained in the printing apparatus 1. For example, if the defective nozzle Nd is discovered by inspection at the time of shipment from a factory, the defective nozzle information Fd may be written in the storage 91 at that stage.

Further, the gradation data Dn can be obtained in various ways. For example, the gradation data Dh may be obtained by reading manuscript data into the storage 91.

As described above, the ink discharge complementing method may further comprises a defective nozzle detection step of printing a defect detection image on the printing medium by the ink discharged from the nozzles by driving the plurality of nozzles and detecting the defective nozzle, out of the plurality of nozzles, based on a result obtained by reading the defect detection image by an imager, the defective nozzle detection step being performed before the conversion step. In this way, the occurrence of the defective nozzle can be precisely grasped, and the defective nozzle can be dealt with.

The ink discharge complementing method may further comprises: a test gradation data preparation step of preparing test gradation data representing a gradation value of each of a plurality of pixels constituting a test image including a plurality of regions having mutually different gradation values; a test conversion step of converting the test gradation data into defect complemented test gradation data by converting the gradation values of the test gradation data using the first conversion rule and second conversion rule; a test halftone step of generating test discharge control data by performing the halftone process for the defect complemented test gradation data; a test image printing step of printing the test image on the printing medium by the ink discharged from the nozzles by driving the nozzles based on the test discharge control data; a gradation value reading step of reading the gradation values of the test image printed on the printing medium by an imager; and a correction rule generation step of generating a shading correction rule to correct the variation of the amount of the ink discharged from each of the plurality of nozzles based on the gradation values read in the gradation value reading step; the test gradation data preparation step, the test conversion step, the test halftone step, the test image printing step, the gradation value reading step and the correction rule generation step being performed before the shading correction step, and the shading correction being performed using the shading correction rule generated in the correction rule generation step in the shading correction step.

In such a configuration, the test image including the plurality of regions having the mutually different gradation values is actually printed and the shading correction rule used in the shading correction is generated based on the result obtained by reading the gradation values of this test image. At this time, the test image is printed after the test gradation data representing the gradation value of each of the plurality of pixels constituting the test image is converted using the first conversion rule and second conversion rule. Therefore, the shading correction can be performed using the test image having the discharge defect of the defective nozzle complemented. As a result, a proper shading correction rule can be generated.

The ink discharge complementing method may be configured so that the second conversion rules are respectively provided for primary adjacent nozzles adjacent to the defective nozzle and for secondary adjacent nozzles adjacent to the primary adjacent nozzles, the second conversion rule for the primary adjacent nozzles has a primary adjacent rate as the second rate and converts the gradation values of the pixels corresponding to the primary adjacent nozzles by the primary adjacent rate, and the second conversion rule for the secondary adjacent nozzles has a secondary adjacent rate lower than the primary adjacent rate and converts the gradation values of the pixels corresponding to the secondary adjacent nozzles by the secondary adjacent rate. In such a configuration, the discharge defect of the defective nozzle can be complemented by substantially adding the gradation values of the pixels corresponding to the primary adjacent nozzles and the secondary adjacent nozzles of the defective nozzle. In addition, an addition rate of the gradation value is lower for the pixels corresponding to the secondary adjacent nozzles than for the pixels corresponding to the primary adjacent nozzles, and decreases with distance from the pixel corresponding to the defective nozzle. Therefore, the discharge defect of the defective nozzle can be more naturally complemented.

The invention is applicable to techniques in general for printing an image by discharging ink from nozzles of a discharge head.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An ink discharge complementing method which complements an ink discharge defect of a defective nozzle, out of a plurality of nozzles of a discharge head, comprising:
   a gradation data acquisition step of obtaining gradation data representing a gradation value of each of a plurality of pixels constituting a print image;
   a conversion step of converting the gradation data into defect complemented gradation data by converting the gradation values of the gradation data, using a first conversion rule for the gradation values of the pixels corresponding to normal nozzles other than surrounding nozzles located around the defective nozzle and the defective nozzle, out of the plurality of nozzles, and a second conversion rule for the gradation values of the pixels corresponding to the surrounding nozzles;
   a shading correction step of performing a shading correction to correct a variation of an amount of the ink discharged from each of the plurality of nozzles for the defect complemented gradation data;
   a halftone step of generating discharge control data by performing a halftone process for the defect complemented gradation data having the shading correction performed therefor; and
   an image printing step of printing the print image on a printing medium by the ink discharged from the nozzles by driving the nozzles based on the discharge control data,
   the first conversion rule converting the gradation values of the pixels corresponding to the normal nozzles by a first rate lower than 100%, and
   the second conversion rule converting the gradation values of the pixels corresponding to the surrounding nozzles by a second rate higher than the first rate.

2. The ink discharge complementing method according to claim 1, further comprising a defective nozzle detection step of printing a defect detection image on the printing medium by the ink discharged from the nozzles by driving the plurality of nozzles and detecting the defective nozzle, out of the plurality of nozzles, based on a result obtained by reading the defect detection image by an imager, the defective nozzle detection step being performed before the conversion step.

3. The ink discharge complementing method according to claim 1, further comprising:
   a test gradation data preparation step of preparing test gradation data representing a gradation value of each of a plurality of pixels constituting a test image including a plurality of regions having mutually different gradation values;
   a test conversion step of converting the test gradation data into defect complemented test gradation data by converting the gradation values of the test gradation data using the first conversion rule and second conversion rule;
   a test halftone step of generating test discharge control data by performing the halftone process for the defect complemented test gradation data;
   a test image printing step of printing the test image on the printing medium by the ink discharged from the nozzles by driving the nozzles based on the test discharge control data;
   a gradation value reading step of reading the gradation values of the test image printed on the printing medium by an imager; and
   a correction rule generation step of generating a shading correction rule to correct the variation of the amount of the ink discharged from each of the plurality of nozzles based on the gradation values read in the gradation value reading step;
   the test gradation data preparation step, the test conversion step, the test halftone step, the test image printing step, the gradation value reading step and the correction rule generation step being performed before the shading correction step, and
   the shading correction being performed using the shading correction rule generated in the correction rule generation step in the shading correction step.

4. The ink discharge complementing method according to claim 1, wherein:
   the second conversion rules are respectively provided for primary adjacent nozzles adjacent to the defective nozzle and for secondary adjacent nozzles adjacent to the primary adjacent nozzles,
   the second conversion rule for the primary adjacent nozzles has a primary adjacent rate as the second rate and converts the gradation values of the pixels corresponding to the primary adjacent nozzles by the primary adjacent rate, and
   the second conversion rule for the secondary adjacent nozzles has a secondary adjacent rate lower than the primary adjacent rate and converts the gradation values of the pixels corresponding to the secondary adjacent nozzles by the secondary adjacent rate.

5. An ink discharge complementing method which complements an ink discharge defect of a defective nozzle, out of a plurality of nozzles of a discharge head, comprising:
   a gradation data acquisition step of obtaining gradation data representing a gradation value of each of a plurality of pixels constituting a print image;
   a shading correction step of performing a shading correction to correct a variation of an amount of the ink discharged from each of the plurality of nozzles for the gradation data;
   a conversion step of converting the gradation data into defect complemented gradation data by converting the gradation values of the gradation data, which has the shading correction performed therefor, using a first conversion rule for the gradation values of the pixels corresponding to normal nozzles other than surrounding nozzles located around the defective nozzle and the defective nozzle, out of the plurality of nozzles, and a second conversion rule for the gradation values of the pixels corresponding to the surrounding nozzles;
   a halftone step of generating discharge control data by performing a halftone process for the defect complemented gradation data; and
   an image printing step of printing the print image on a printing medium by the ink discharged from the nozzles by driving the nozzles based on the discharge control data,
   the first conversion rule converting the gradation values of the pixels corresponding to the normal nozzles by a first rate lower than 100%, and
   the second conversion rule converting the gradation values of the pixels corresponding to the surrounding nozzles by a second rate higher than the first rate.

6. A printing apparatus including a discharge head having a plurality of nozzles and configured to complement an ink discharge defect of a defective nozzle, out of the plurality of nozzles, comprising:
   a gradation data acquisitor which obtains gradation data representing a gradation value of each of a plurality of pixels constituting a print image;

a storage which stores a first conversion rule for the gradation values of the pixels corresponding to normal nozzles other than surrounding nozzles located around the defective nozzle and the defective nozzle, out of the plurality of nozzles, and a second conversion rule for the gradation values of the pixels corresponding to the surrounding nozzles;

a data converter which converts the gradation data into defect complemented gradation data by converting the gradation values of the gradation data using the first conversion rule and second conversion rule stored in the storage;

a shading corrector which performs a shading correction to correct a variation of an amount of the ink discharged from each of the plurality of nozzles for the defect complemented gradation data;

a halftone processor which generates discharge control data by performing a halftone process for the defect complemented gradation data having the shading correction performed therefor; and a drive controller which prints the print image on a printing medium by the ink discharged from the nozzles by driving the nozzles based on the discharge control data, the first conversion rule converting the gradation values of the pixels corresponding to the normal nozzles by a first rate lower than 100%, and the second conversion rule converting the gradation values of the pixels corresponding to the surrounding nozzles by a second rate higher than the first rate.

7. A printing apparatus including a discharge head having a plurality of nozzles and configured to complement an ink discharge defect of a defective nozzle, out of the plurality of nozzles, comprising:

a gradation data acquisitor which obtains gradation data representing a gradation value of each of a plurality of pixels constituting a print image;

a shading corrector which performs a shading correction to correct a variation of an amount of the ink discharged from each of the plurality of nozzles for the gradation data;

a storage which stores a first conversion rule for the gradation values of the pixels corresponding to normal nozzles other than surrounding nozzles located around the defective nozzle and the defective nozzle, out of the plurality of nozzles, and a second conversion rule for the gradation values of the pixels corresponding to the surrounding nozzles;

a data converter which converts the gradation data into defect complemented gradation data by converting the gradation values of the gradation data having the shading correction performed therefor, using the first conversion rule and second conversion rule stored in the storage;

a halftone processor which generates discharge control data by performing a halftone process for the defect complemented gradation data; and a drive controller which prints the print image on a printing medium by the ink discharged from the nozzles by driving the nozzles based on the discharge control data, the first conversion rule converting the gradation values of the pixels corresponding to the normal nozzles by a first rate lower than 100%, and the second conversion rule converting the gradation values of the pixels corresponding to the surrounding nozzles by a second rate higher than the first rate.

* * * * *